March 22, 1966      J. F. FLORY      3,241,848
STAIR-CLIMBING VEHICLE
Filed Dec. 27, 1963      3 Sheets-Sheet 1
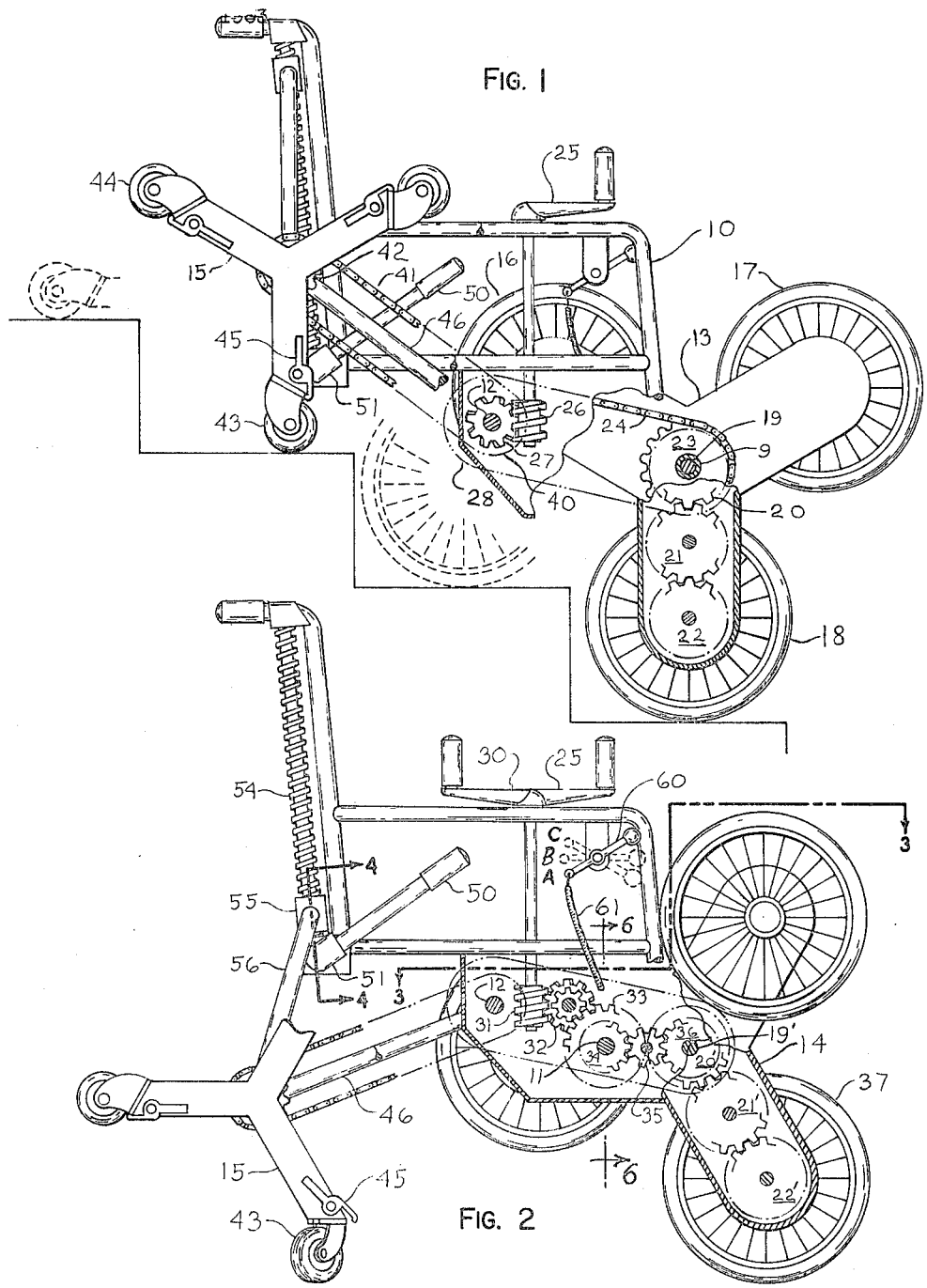
INVENTOR; JOHN F. FLORY
BY Edward L. Amonett
AGENT March 22, 1966 J. F. FLORY 3,241,848
STAIR-CLIMBING VEHICLE
Filed Dec. 27, 1963 3 Sheets-Sheet 2

INVENTOR: JOHN F. FLORY
BY Edward L. Amonette
AGENT

United States Patent Office 3,241,848
Patented Mar. 22, 1966

3,241,848
STAIR-CLIMBING VEHICLE
John F. Flory, Albuquerque, N. Mex.
(1814 Grant St., Beatrice, Nebr.)
Filed Dec. 27, 1963, Ser. No. 333,881
17 Claims. (Cl. 280—5.26)

My invention relates generally to stair-climbing vehicles, and more specifically to such vehicles employing a multiple-armed wheel-supporting spider which is driven in rotation.

The term "stair-climbing vehicle" as used herein applies to that class of vehicles particularly designed for traversing uneven terrain. In contemporary use stairs are a common example of such terrain and therefore the term "stair-climbing" is widely used. It is not my intention, however, to confine my invention to its most obvious use, climbing stairs, but to describe a preferred embodiment designed for that purpose, and to limit the invention only by the claims.

Since stairs were designed principally for the use of humans, stair-climbing vehicles frequently are designed to attempt to simulate the stepping action of the human body. Hence there are numerous vehicle designs which utilize a multiple-armed wheel-supporting spider driven in rotation so as to place rotatively supported wheels, located near the ends of the arms, successively on a wheel-supporting surface which may be a flight of stairs. Some such vehicles utilize wheels which lack driving connection with the remainder of the vehicle, and therefore are free to rotate about their individual axes. Such vehicles are inherently dangerous, particularly when used as wheel chairs, because the operator has no control of the rotation of the wheels and the wheels are susceptible to uncontrolled rolling, and therefore to uncontrolled descent of the stairs. Other such vehicles utilize wheels having driving connections with the spider or with the remainder of the vehicle which force the wheels to rotate in a prescribed manner as the multiple-armed spider rotates. Such vehicles are dangerous because as the wheels rotate they may roll over the edge of the supporting surface and cause overturning of the vehicle. Such vehicles also may be destructive to the supporting surface and wheel tread because as the wheels rotate they may come in contact with an obstruction and be forced to slip against the obstruction and the supporting surface.

It is an object of my invention to provide a stair-climbing vehicle in which the rotation of the wheels with respect to the frame, and thereby with respect to the ground, can be controlled at all times. The wheels of this vehicle, therefore, are not apt to roll over the edge of the wheel-supporting surface nor to be forced to slip when contact is made with an obstruction.

Another object of my invention is to provide a stair-climbing vehicle which can be powered by the occupant.

Still another object of my invention is to provide a stair-climbing vehicle which can be quickly converted from a climbing configuration to a running configuration for use on smooth terrain.

These and other objects which will become evident, are accomplished by means of a vehicle having at least one multiple-armed wheel-supporting spider with a wheel mounted near the end of each arm. The wheels are connected by means of an epicyclic drive to a power source, which may be the occupant of the vehicle. On smooth terrain one of the wheels on the spider rests against the terrain and is driven in forward or reverse motion through the epicyclic drive, propelling the vehicle accordingly. On rough terrain, such as stairs, the multiple-armed spider is driven in rotation while the central or sun gear of the epicyclic drive, or its equivalent, is held stationary with respect to the frame of the vehicle. A 1:1 ratio between the sun gear or its equivalent, and a planet gear or its equivalent attached coaxially to each wheel, causes the wheel, although rotating with respect to the spider arm, to undergo no rotation on its axis with respect to the frame of the vehicle. As the spider rotates successive wheels are brought to bear against successive portions of the rough terrain, such as successive stairs of a flight of stairs, and there placed, begin to support the weight of the vehicle.

A better understanding of my invention may be gained by reading the more detailed description which follows, in conjunction with the appended claims and the attached drawing, in which:

FIG. 1 shows a side view of a preferred embodiment of my invention, a wheel chair, in its stair-climbing configuration, the cutaway portion being a partial sectional view taken along the line 1—1 of FIG. 3;

FIG. 2 is a side view of the preferred embodiment in its running configuration, the cutaway portion being a partial sectional view taken along the line 2—2 of FIG. 3;

Figure 3:
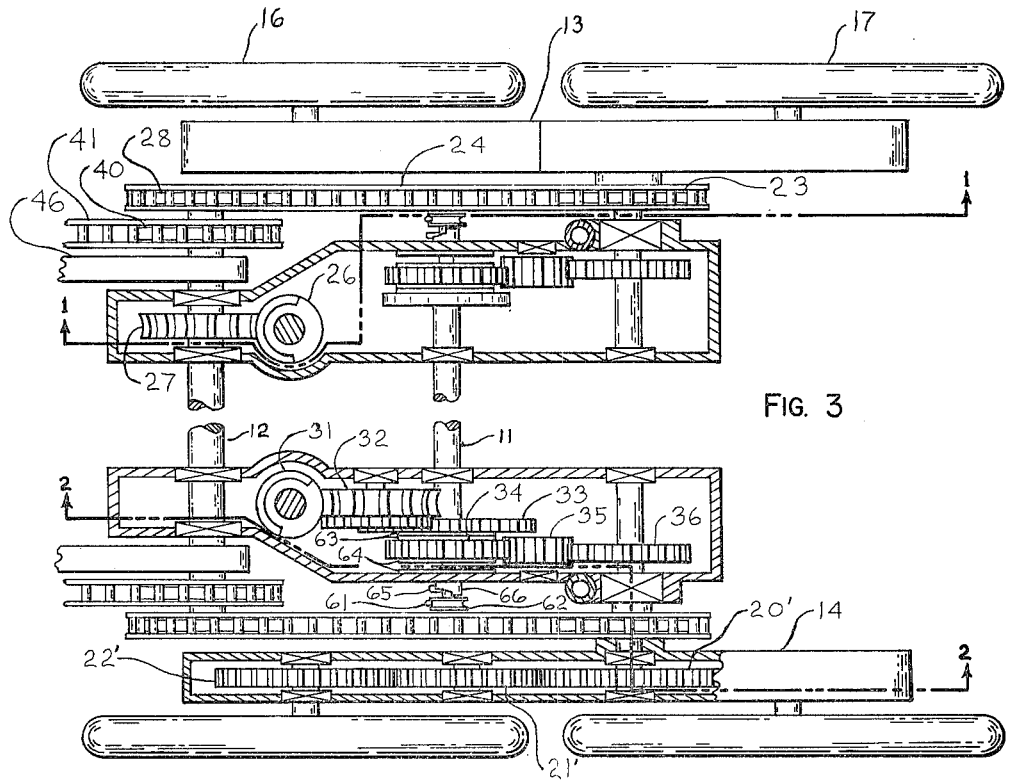
FIG. 3 is an enlarged partial sectional view taken from above along the line 3—3 of FIG. 2.

Referring now to FIG. 2 of the drawing, frame 10 is seen to rotatably support a multiple-armed spider 14. The frame 10 also supports a transverse shaft 12 from which is pivoted an arm 46 which supports a second multiple-armed spider 15. A similar set of spiders is located on the other side of the frame.

Referring to FIG. 1, wheels 16, 17, and 18 are rotatably mounted near the ends of their respective arms on spider 13, each wheel being connected to a planet gear such as 22 which is driven through an idler gear such as 23 by a sun gear 20. The sun gear 20 is fixed to a shaft 19, free to turn within shaft 9. Sun gear 20 and planet gear 22 have the same effective diameters, and hence are geared at a 1:1 ratio.

As shown in FIG. 2, the vehicle is propelled by rotation of crank 30 which drives worm 31. Worm 31 drives combined worm gear and spur gear 32 which in turn drives gear 33. Gear 33 drives gear 34 through the clutch plates 63, as shown in FIG. 3. Gear 34 drives idler gear 35 which drives gear 36. Gear 36 is attached to shaft 19′ and through it drives gear 20′. Gear 20′ drives gear 21′ and hence gear 22′ which is attached to the wheel 37. The result is that wheel 37 is turned in response to a rotary motion applied to crank 30. Rotation of gear 33 is transmitted through shaft 11 to a similar gearing arrangement on the other side of the frame, and therefore to wheel 18. Since worm 31 is used in the gear train, the train is irreversible, that is force applied to the wheel 37 will not be transmitted to the crank 30. The vehicle may be propelled either forward or backward depending on the direction that crank 30 is turned.

Figure 6:
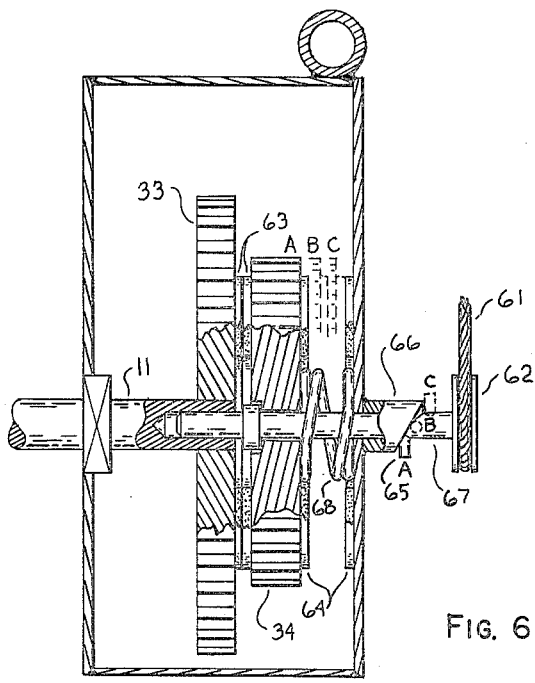
FIG. 6 is a cutaway view of the combination braking-clutching-freewheeling mechanism taken along the line 6—6 of FIG. 2.

Referring to FIGS. 2 and 6 gear shift lever 60 operates cable 61 over pulley 62, forcing cam follower 65 over a cam surface on outer shaft 66, thus moving shaft 67 axially and positioning gear 34 against a retaining force supplied by spring 68. In the position shown A, gear shift lever 60 places clutch plates 63 in engagement so that force is transmitted from gear 33 to gear 34. With the gear shift lever 60 positioned in the intermediate position B, shown by broken line, cam follower 65 assumes a new position on the cam surface, pulling clutch plates 63 apart and allowing gear 34 and therefore wheel 37 to rotate freely. This allows the vehicle to be pushed. With the gear shift lever 60 in the lower position C, shown by broken line, clutch plates 64 are engaged. One of these clutch plates is fixed to the frame and therefore, in this position gear 34 and hence wheel 37 are restrained from moving with respect to the frame. A similar gear shifting arrangement is provided on the other side, as can be seen from the drawing.

Figure 4:
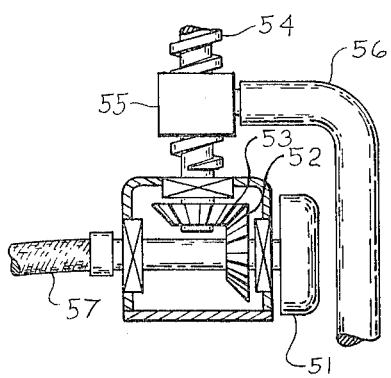
FIG. 4 is an enlarged partial sectional view of an adjusting mechanism used in converting from climbing configuration to running configuration, taken along the line 4—4 of FIG. 2.

In preparation for climbing an obstacle it is first necessary to position the vehicle so that the rear castered wheels such as 43 are in a position adjacent to the base of the obstacle. It is then necessary to raise the rear spiders such as 15 in relation to the frame. A pumping motion is applied to handle 50 which, through a conventional reversible ratchet mechanism 51, transmits unidirectional rotary motion to bevel gear 52 shown in FIG. 4. Bevel gear 52 drives bevel gear 53 which turns screw shaft 54 in unidirectional rotary motion. Rotation of the screw shaft 54 moves follower nut 55 axially along the screw shaft. Strut 56, attached to follower nut 55, thereby raises the rear spider 15 which it supports. Rotation of bevel gear 52 is transmitted to a similar mechanism on the other side of the frame through shaft 57 thereby raising the second rear spider. By shifting the ratchet mechanism 51 the direction of rotation of the screw shaft 54 is reversed and the rear spiders can be lowered.

After the rear spiders have been raised to a position in relation to the frame as necessitated by the height of the obstacle, the castering wheels such as 43 are placed in position and held there by locks such as 45. The gear shift lever 60 is then placed in either the locked or in gear position. In the locked position the wheels such as 37 cannot rotate with respect to the frame. In the in-gear position the wheels will rotate with respect to the frame only if the operator applies power through crank 30.

Now that the vehicle is in the climbing configuration it can be caused to step its way up the stairs by the rotation of crank 25. Crank 25 drives worm 26 which drives worm gear 27 and the attached shaft 12. This drives sprocket 28 which drives sprocket 23 through chain 24. Sprocket 23 is fixed to shaft 9 which is fixed to spider 13. Hence the turning of crank 25 results in the rotation of spider 13. A similar set of sprockets and chain is located on the other side of the frame and drives spider 14 in synchronism with spider 13. As the spider 13 turns, wheels 16, 17, and 18 are carried with it and revolve about shaft 9. Since the wheels such as 18 are connected through 1:1 ratio gearing such as 20, 21, and 22 with the shaft 19, and since shaft 19 is in turn fixed in relation to the frame because of the gear shift position, the wheels do not rotate about their axes with respect to the frame. Since the frame does not rotate with respect to the obstacle the wheels then do not rotate with respect to the obstacle. Also attached to shaft 12 is a sprocket 40 which rotates and, through chain 41, drives sprocket 42 which in turn drives a rear spider in synchronism with spider 13. A similar arrangement on the other side of the frame drives rear spider 15 in synchronism therewith.

For example, with wheel 18 in position on the stair as shown in FIG. 1, the turning of crank 25 in the proper direction turns spider 13 in a counterclockwise direction about the axis of wheel 18 while the wheel itself remains stationary on its stair. Spider 15 rotates simultaneously in a counterclockwise direction about the axle of caster wheel 43. As the spiders are rotated, the next adjacent wheel 16 and the next adjacent caster wheel 44 are brought down on the next stair, as shown in broken lines. The load is brought to bear on wheel 16 and caster wheel 44 and is removed from wheel 18 and caster wheel 43. Continued rotation causes the spiders 13 and 15 to rotate about wheels 16 and 44 respectively and wheels 18 and 43 to be lifted from their respective stairs. The vehicle frame is simultaneously raised with respect to wheels 16 and 44, and therefore with respect to the stairs.

The dimensions of stair flights are subject to much variation. Although the wheels and spiders can be proportioned and arranged to permit climbing of a number of stairs without adjustment, some stairs will be encountered on which the successive wheels will be placed either farther forward or farther rearward on each successive stair. Should such a stair flight be encountered it is only necessary that the operator reposition the wheels with respect to the stairs whenever the wheels approach the front or rear of the stairs by engaging the gearing through the use of the gear shift lever 60, and then turning crank 30 so as to rotate the wheels.

When the top of the stairs is reached the castered wheels such as 43 in contact with the supporting surface are unlocked. The ratchet mechanism 51 is reversed and the rear spiders such as 15 are lowered with respect to the frame as described previously. The gearing is then engaged and the vehicle is ready to be driven away.

To descend stairs the vehicle is first positioned above the first stair and the gearing is then either engaged or braked. The rear spiders are then raised with respect to the frame and the castered wheels are locked in position. The climbing process is then executed in reverse placing successive wheels on successively lower stairs until the bottom is reached. The vehicle is then restored to its running configuration.

Figure 5:
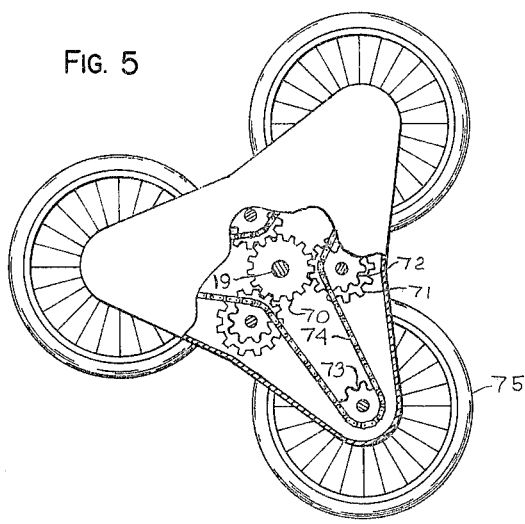
FIG. 5 is a cutaway view of an alternate embodiment of the epicyclic drive.

An alternate epicyclic drive is shown in FIG. 5. Sun gear 70 is connected to shaft 19. Idler gears such as 71 are driven by gear 70, and in turn are connected with the drive idler sprockets such as 72. The idler sprockets drive, through chain 74, planet sprockets such as 73 which are connected to wheels such as 75. To achieve the 1:1 ratio, it is necessary that the ratio of effective diameters of gears 70 and 71 be equal to the ratio of effective diameters of sprockets 73 and 72.

In assessing this invention it should be borne in mind that during ascent or descent of stairs the wheels in contact with the stairs do not rotate with respect to the stairs. They are not forced to rotate while the muliple-armed spider rotates. They are not left free to rotate. Some previous designs, although employing multiple-arm spiders, had no provision for control of the wheels during operation. Other previous designs employed driving connections with the wheels which forced the wheels to rotate with respect to the stairs when the spider was rotated. The dangers and disadvantages of such arrangements where discussed previously.

Although the preferred embodiment is shown as a wheel chair, those skilled in the art will recognize that my invention is not confined thereto but instead is readily applicable to other vehicles such as hand trucks, over land vehicles and lunar vehicles.

I claim:

1. A stair-climbing vehicle comprising in combination with a frame:
   a multiple-armed wheel-supporting spider rotatably mounted on the frame;
   additional means attached to the frame for support of said vehicle;
   means for driving said spider in rotation;
   and means preventing rolling of the wheels of said spider on a wheel-supporting surface during rotation of said spider.

2. The vehicle of claim 1 wherein the last-named means comprises an epicyclic drive with a 1:1 ratio between the frame and each of the wheels.

3. The vehicle of claim 2 wherein the epicyclic drive comprises rolling means in combination with flexible driving means.

4. The vehicle of claim 2 wherein the epicyclic drive comprises:
   a sun gear fixed in relation to the frame;
   a planet gear fixed in relation to each of said wheels;
   and an idler gear between the sun and each planet gear.

5. The vehicle of claim 4 wherein the sun and the planet gears have the same effective diameter.

6. A stair-climbing vehicle comprising in combination with a frame:
a first and a second multiple-armed wheel-supporting spider rotatably mounted on the frame and spaced transversely from one another;
a third multiple-armed wheel-supporting spider rotatably mounted on the frame and spaced longitudinally from the first and second spiders;
irreversible gearing for driving said spiders in synchronism from a power source;
and means preventing rolling of the wheels of two of said spiders on a wheel-supporting surface during rotation of said spiders.

7. The vehicle of claim 6 wherein the two spiders of the last-named means are said first and second spiders.

8. A stair-climbing vehicle comprising in combination with a frame:
a first pair of multiple-armed wheel-supporting spiders spaced transversely and rotatably mounted near the front of the frame;
a second pair of multiple-armed wheel-supporting spiders spaced transversely and rotatably mounted near the rear of the frame;
irreversible gearing for driving said spiders in synchronism from a power source;
and an epicyclic drive with a 1:1 ratio between the frame and the wheels of said first pair of spiders, whereby the wheels are prevented from rolling on a wheel-supporting surface during rotation of said first pair of spiders.

9. The vehicle of claim 8 further including:
means for raising the second pair of spiders relative to the first.

10. The vehicle of claim 9 wherein each spider has three arms.

11. In a stair-climbing vehicle having, rotatably mounted on a frame, a multiple-armed wheel-supporting spider which is driven in rotation to place its wheels successively on a wheel-supporting surface, the provision of means for preventing rolling of said wheels on said surface during rotation of the spider.

12. The invention of claim 11 wherein the means provided comprises an epicyclic drive between the frame and said wheels, the driving ratio being such that said wheels do not rotate about their axes with respect to the frame.

13. The invention of claim 12 wherein the epicyclic drive comprises:
a sun gear held stationary with respect to the frame;
a planet gear mounted concentrically on each wheel;
and at least one additional gear idling between the sun and planet gears, said idler gearing forcing the planet gear to turn in the same direction as the spider, and said sun and planet gears having an effective 1:1 ratio.

14. A stair-climbing wheel chair comprising in combination with a frame:
a first pair of multiple-armed wheel-supporting spiders spaced transversely and rotatably mounted near the front of the frame;
a second pair of multiple-armed wheel-supporting spiders spaced transversely and rotatably mounted near the rear of the frame, the wheels thereof being castered;
irreversible gearing for driving said spiders in synchronism from a power source;
means including irreversible gearing for driving the wheels of the first pair of spiders about the axes of said wheels, said means further including with each spider a sun gear coaxial with said spider, a planet gear coaxially fixed on each wheel, and an idler gear between the sun and each planet gear, said sun and planet gears having a 1:1 ratio;
means for raising and lowering the second pair of spiders relative to the first;
and means for receiving an occupant in seated position.

15. A stair-climbing vehicle comprising in combination with a frame:
a multiple-armed wheel-supporting spider rotatably mounted on the frame;
additional means attached to the frame for support of said vehicle;
means for driving said spider in rotation;
and means for driving the wheels of said spider and varying their speed of rotation with respect to the speed of rotation of the spider while the spider is being driven in rotation.

16. The vehicle of claim 1 in which the means for driving the spider is irreversible.

17. The vehicle of claim 15 wherein the spider is rotatably mounted on the frame by a hollow shaft and wherein the wheel-driving means comprises a shaft concentrically within the hollow shaft.

References Cited by the Examiner

UNITED STATES PATENTS

| 1,551,127 | 8/1925 | Whyel | 280—5.26 |
| 2,400,824 | 5/1946 | Jackson | 180—8 |
| 2,742,973 | 4/1956 | Johannesen | 180—8 |
| 2,931,449 | 4/1960 | King | 180—8 |

FOREIGN PATENTS 1,179,623  12/1958  France.

LEO FRIAGLIA, *Primary Examiner.*